United States Patent
Xu et al.

(10) Patent No.: US 10,441,973 B2
(45) Date of Patent: Oct. 15, 2019

(54) VIBRATION DEVICE AND ELECTRONIC DEVICE

(71) Applicant: AAC Technologies Pte, Ltd., Singapore (SG)

(72) Inventors: Xiang Xu, Shenzhen (CN); Jinquan Huang, Shenzhen (CN); Hongfu Xu, Shenzhen (CN); Fanghua Ling, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 227 days.

(21) Appl. No.: 15/652,783

(22) Filed: Jul. 18, 2017

(65) Prior Publication Data

US 2018/0297073 A1 Oct. 18, 2018

(30) Foreign Application Priority Data

Apr. 14, 2017 (CN) ............. 2017 2 0398116 U

(51) Int. Cl.
*H02K 33/00* (2006.01)
*B06B 1/04* (2006.01)
*H02K 33/18* (2006.01)
*H02K 33/16* (2006.01)

(52) U.S. Cl.
CPC ............. *B06B 1/045* (2013.01); *H02K 33/16* (2013.01); *H02K 33/18* (2013.01)

(58) Field of Classification Search
CPC ............................ H02K 33/16; H02K 33/18
USPC ........................................ 310/15, 25, 30, 36
See application file for complete search history.

(56) References Cited

U.S. PATENT DOCUMENTS

| | | | |
|---|---|---|---|
| 6,590,991 B1* | 7/2003 | Maeda | H02K 33/06 381/396 |
| 2012/0153748 A1* | 6/2012 | Wauke | H02K 33/16 310/25 |
| 2013/0033128 A1* | 2/2013 | Yoon | H02K 33/16 310/25 |
| 2013/0229070 A1* | 9/2013 | Akanuma | H02K 33/00 310/25 |
| 2013/0241321 A1* | 9/2013 | Akanuma | H02K 5/24 310/25 |
| 2017/0117789 A1* | 4/2017 | Mao | H02K 33/16 |

* cited by examiner

*Primary Examiner* — Hanh N Nguyen
(74) *Attorney, Agent, or Firm* — IPro, PLLC; Na Xu

(57) ABSTRACT

A vibration device, including a shell, a cover plate, a vibrator, a stator and an elastic member, the cover plate is matched with the shell to form accommodating space, the vibrator, the stator and the elastic member are accommodated in the accommodating space, one of the vibrator and the stator includes a magnetic circuit unit while the other one includes a coil. the elastic member includes a first connecting portion fixedly connected with the vibrator, a pair of elastic portions bending and extending from two opposite ends of the first connecting portion, and a pair of second connecting portions extending from a tail end of each elastic portion in the direction facing each other, and the pair of second connecting portions is fixedly connected with the shell to suspend the vibrator in the accommodating space.

7 Claims, 3 Drawing Sheets

VIBRATION DEVICE AND ELECTRONIC DEVICE

TECHNICAL FIELD

The present disclosure relates to the field of vibration technologies and, in particular, to a vibration device and an electronic device including the vibration device.

BACKGROUND

A vibration device is a component that utilizes the principle of generating electromagnetic force to convert electrical energy into mechanical energy. The vibration device is usually installed in an electronic product such as a portable phone, so as to produce a silent feedback signal.

However, in a traditional vibration device, a spring is arranged respectively at two opposite ends of a magnetic circuit unit, so that the magnetic circuit unit in a shell. In the vibration device with such a structure, an arm of force of the spring is short due to the space for the spring is limited, and thus a large stress will be generated, which will influence the vibrating performance and service life of the vibration device.

Therefore, it is necessary to provide a vibration device having a new structure.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

Figure 1:
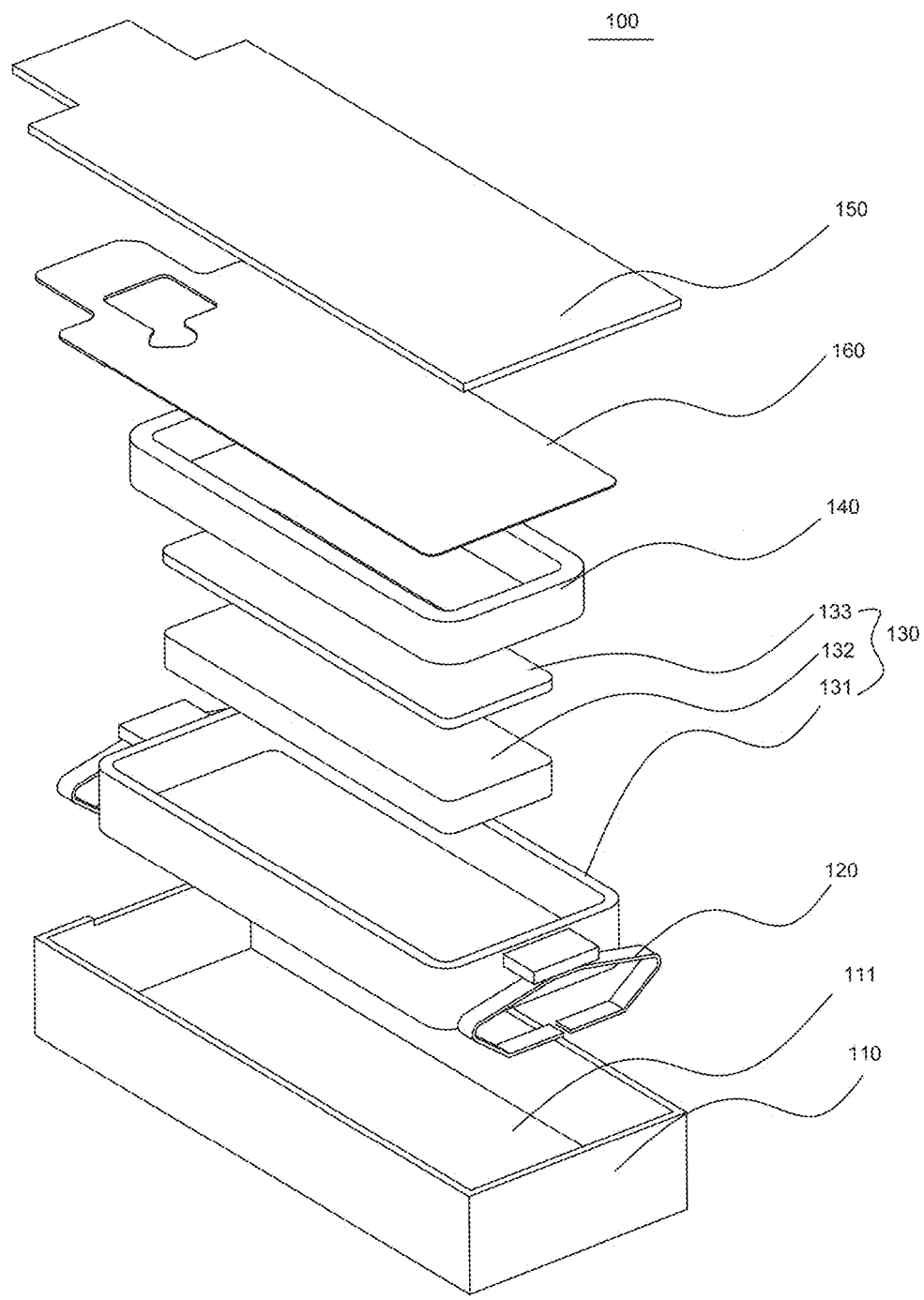
FIG. 1 is a exploded perspective schematic view of a vibration device in accordance with an exemplary embodiment of the present disclosure.
Figure 2:
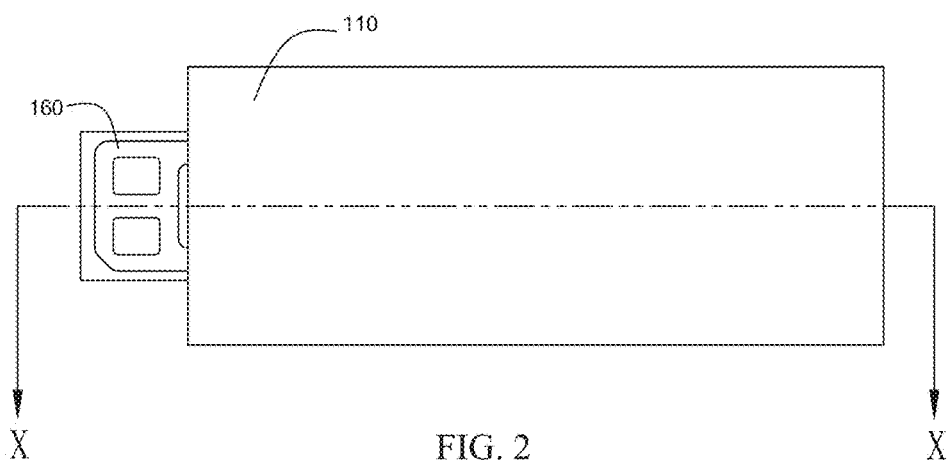
FIG. 2 is a front view of the vibration device shown in FIG. 1.

The present disclosure will be described in detail with reference to FIGS. 1-5.

As shown in FIGS. 1-5, in a first aspect of the present disclosure, a vibration device 100 is provided. The vibration device 100 includes a shell having accommodating space 111, a vibrator (not labeled), a stator (not labeled) and an elastic member 120. The vibrator, the stator and the elastic member 120 are accommodated in the accommodating space 111. Specifically, the shell includes a housing 110 and a cover plate 150 assembled with the housing 110 to form the accommodating space 111. The housing 110 can generally be of a cuboid structure. It should be noted that, the above-described cover plate 150 can be formed as an integrated structure together with the housing 110, or the cover plate 150 can also be a separate component. In order to achieve a better sealing effect, the shape of the cover plate 150 shall be the same as the shape of a printed circuit board (Printed Circuit Board, PCB) 160 (which will be described later), so that the cover plate 150 can completely cover the PCB 160 when completely covering the housing 110.

One of the vibrator and the stator includes a magnetic circuit unit 130, and the other one of the vibrator and the stator includes a coil 140. For ease of description, in an exemplary embodiment, the vibrator includes the magnetic circuit unit 130, and the stator includes the coil 140. The coil 140 interacts with the magnetic circuit unit 130 to drive the vibrator to vibrate, so that an electronic device (e.g., a cellphone) having the vibration device 100 can sound.

The above-described elastic member 120 includes a first connecting portion 123 fixedly connected with the vibrator, a pair of elastic portions 122 bending and extending from two opposite ends of the first connecting portion 123, and a pair of second connecting portion 121 extending from a tail end of each elastic portion in a direction facing each other. The pair of second connecting portions 121 is fixedly connected with the housing 110, so that the vibrator is suspended in the accommodating space 111. It should be understood that, in other embodiments, the second connecting portion 121 can also be fixedly connected with the cover plate 150. The elastic member 120 carries the vibrator to suspend the vibrator in the housing 110, when the vibration device 100 vibrates, a large interval will be formed between a first stage modal frequency of the elastic member 120 and a second stage modal frequency of the elastic member 120, stress concentration phenomenon can be effectively avoided, thereby improving strength and service life of the vibration device 100.

In other words, the elastic member 120 may not integrally be of an elastic structure, for example, the pair of second connecting portions 121 fixedly connected with the housing 110 and the first connecting portion 123 fixedly connected with the vibrator may not be elastic, while only the elastic portion 122 between the first connecting portion 123 and the second connecting portion 121 is elastic. Since the elastic portion 122 is suspended in the housing 110, the whole magnetic circuit unit 130 can be suspended in the housing. Of course, in order to simplify the manufacturing process of the elastic member 120, the elastic member 120 can be formed as an integrated structure, that is, the elastic member 120 can also be integrally elastic.

Figure 3:
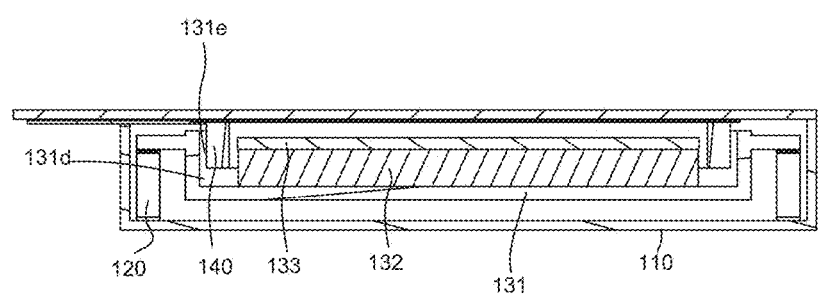
FIG. 3 is a cross-sectional view along the line X-X in FIG. 2.
Figure 5:
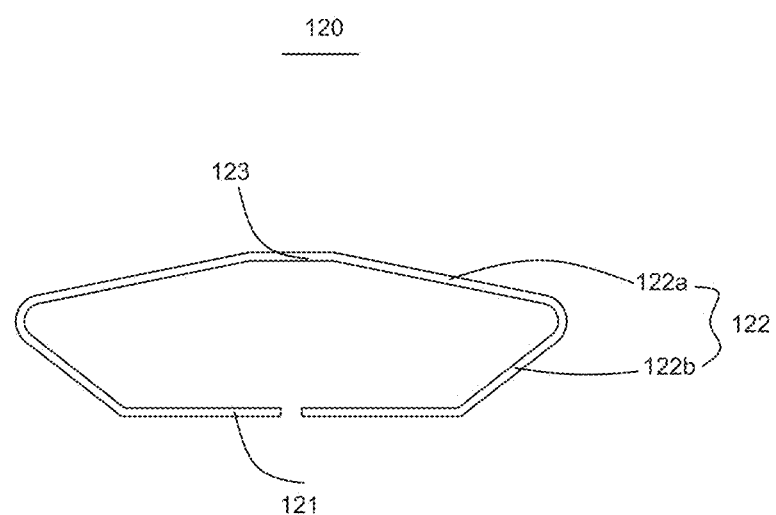
FIG. 5 is a structural schematic view of an elastic member in accordance with an exemplary embodiment of the present disclosure.

With reference to FIG. 1, FIG. 3 and FIG. 5, the first connecting portion 123 is generally of a strip-sheet structure and includes two opposite ends. The elastic portion 122 includes a first elastic connecting arm 122a and a second elastic connecting arm 122b, one end of the first elastic connecting arm 122a is connected with one end of the first connecting portion 123, and one end of the second elastic connecting arm 122b is connected with one end of the second connecting portion 121, and the other end of the first elastic connecting arm 122a is connected with the other end of the second elastic connecting arm 122b to form an included angle. The included angle is preferably an acute angle.

Specifically, the pair of first elastic connecting arms 122a respectively bends and extends from two ends of the first connecting portion 123 in a direction away from each other. The pair of second elastic connecting arms 122b respectively bends and extends from a tail end of the pair of first elastic connecting arms 122a in a direction toward each other. The pair of second connecting portions 121 respectively extends from a tail end of the pair of second elastic connecting arms 122b in a direction toward each other, so that a surrounding structure with an opening is formed, the surrounding structure can be a circular structure or another surrounding structure, which can effectively increase the length of an arm of elastic force of the elastic member 120, so that stress concentration phenomenon can be effectively avoided, thereby improving the product performance.

With reference to the FIG. 1, the magnetic circuit unit 130 includes a magnetic conductor 131 having containing space 131d, and a main magnet 132 arranged in the containing space 131d. The main magnet 132 is winded by the coil 140.

The shape of the above-described magnetic conductor 131 can be similar to the shape of the housing 110, that is, the magnetic conductor 131 can generally be of a cuboid structure. The main magnet 132 is winded by the above-described coil 140, that is, the size of the main magnet 132 should be smaller than the size of the containing space 131d.

Figure 4:
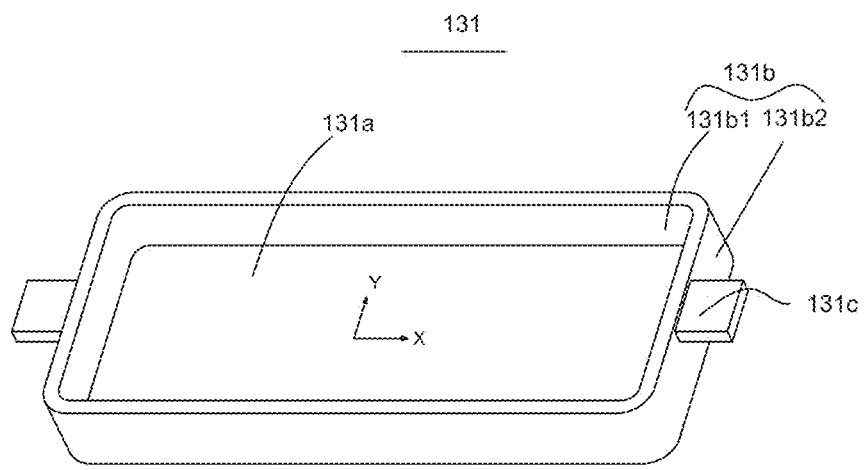
FIG. 4 is a structural schematic view of a magnetic conductor in accordance with an exemplary embodiment of the present disclosure.

With reference to the FIGS. 3-4, the magnetic conductor 131 includes a bottom wall 131a and a side wall 131b bending and extending along the bottom wall 131a, the bottom wall 131a and the side wall 131b together form the containing space 131d. The main magnet 132 is fixed on the bottom wall 131a. The main magnet 132 and the side wall 131b are spaced from each other to form a magnetic gap 131e, and the coil 140 is inserted into the magnetic gap. The first connecting portion 123 is fixedly connected with the magnetic conductor 131.

The above-described structure is a specific structure of the magnetic conductor 131. It should be understood that, the magnetic conductor 131 can be formed as an integrated structure. In order to reduce the stress applied on the magnetic conductor 131, a chamfer structure is provided between the bottom wall 131a and each side wall 131b adjacent to the bottom wall 131a, that is, each side wall 131b bends toward the same direction (for example, extends toward the cover plate 150) to form containing space together with the bottom wall 131a. Of course, the magnetic conductor 131 may not be formed as an integrated structure, instead, the magnetic conductor 131 can be made separately, for example, firstly a bottom plate is provided to form the bottom wall 131a, and then a plurality of side walls 131b is fixedly arranged on the bottom wall 131a (for example, by a welding process, etc.).

With reference to the FIGS. 3-4, in order to further improve space utilization of the housing 110 and make the stress applied on the elastic member 120 more uniform, the side wall 131b includes a pair of a first side walls 131b1 arranged symmetrically in a long axis direction X and a pair of second side walls 131b2 arranged symmetrically in a short axis direction Y. The first side wall 131b1 is connected with the second side wall 131b2, two elastic members 120 are provided and respectively connected with the pair of second side walls 131b2.

In order to improve space utilization of the housing 110, the second side wall 131b2 is provided with a protruding portion 131c extending to the housing 110. The protruding portion 131c is located in a central area of the second side wall 131b in the short axis direction Y. The protruding portion 131c corresponds to the elastic member 120, and the elastic member 120 is connected with the protruding portion 131c corresponding to the elastic member 120.

In other words, the number of the elastic member 120 provided in the vibration device 100 corresponds to the number of the protruding portion 131c provided on the second side wall 131b2. Therefore, the first connecting portion 123 of each elastic member 120 can be provided on the protruding portion 131c corresponding to the first connecting portion 123 of each elastic member 120.

It should be noted that, it is not limited on how the first connecting portion 123 is connected with the protruding portion 131c, for example, the first connecting portion 123 can be welded on the protruding portion 131c by a welding process. Obviously, the first connecting portion 123 can also be fixed on the protruding portion 131c in other manners, for example, by a fixing member.

In addition, in order to allow the protruding portion 131c to be more stably connected with the first connecting portion 123, the extending length of the protruding portion 131c can be greater than the width of the first connecting portion 123 of the elastic member 120. In the vibration device 100 having such a structure, in the limited space of the housing 110, an arm of force of the elastic member can be effectively increased, thus the stress applied on two elastic members 120 located on the two second side walls 131b2 of the magnetic conductor 131 can be more uniform, which can improve the fixing strength of the vibration device 100, and increase service life of the vibration device 100.

It should be noted that, specific material of the elastic member 120 is not limited, for example, the elastic member 120 can be a spring, and of course it can also be made of other elastic material.

In order to further improve the vibrating performance of the vibration device 100, the magnetic circuit unit 130 further includes a pole plate 133. The pole plate 133 is fixedly arranged at a side of the main magnet 132, and the side of the main magnet 132 is facing away from the bottom wall 131a of the magnetic conductor 131.

In the vibration device as shown in FIG. 1 and FIG. 3, the coil 140 is fixedly arranged on the cover plate 150 and is provided on a side of the cover plate 150 facing the housing 110. That is, the coil 140 is located between the cover plate 150 and the housing 110.

In order to conduct the above-described coil 140, so that a magnetic circuit can be formed in the vibration device 100, the vibration device 100 further includes a PCB 160. The PCB 160 is arranged between the cover plate 150 and the coil 140, the coil 140 is electrically connected with the PCB 160. The coil 140 is fixed at a side of the cover plate 150 by the PCB 160, and the side of the cover plate 150 faces the housing 110.

Specific structure of the PCB 160 is not limited herein, for example, the PCB 160 can be of a flexible PCB structure, and obviously the PCB 160 can also be of other structures.

The present disclosure further relates to an electronic device (not shown in the figures), the electronic device includes the vibration device 100 described above.

The above is a specific application scenario of the vibration device 100, the electronic device, for example, can be an electronic product such as a cellphone etc. When configuring the above vibration device 100 into the cellphone, the vibration device 100 can vibrate in a direction vertical to the cellphone shell, so that the cellphone shell vibrate and sound. Since the vibration device 100 in the electronic device has the structure as described above, the stress applied on elastic member 120 is more uniform, which can effectively avoid stress concentration phenomenon, and improve the strength and service life of the vibration device 100, thereby improving the strength and service life of the electronic device.

It should be noted that, the above are merely embodiments of the present disclosure, those skilled in the art can make improvements without departing from the inventive concept of the present invention, however, these improvements shall belong to the protection scope of the present invention.

What is claimed is:

1. A vibration device, comprising:
a shell having accommodating space, the shell comprising a housing and a cover plate assembled with the housing to form the accommodating space,
a vibrator accommodated in the accommodating space,
a stator accommodated in the accommodating space, and
a pair of elastic members accommodated in the accommodating space,
wherein the vibrator comprises a magnetic circuit unit, and the stator comprises a coil,
wherein the magnetic circuit unit comprises a magnetic conductor having containing space, and a main magnet arranged in the containing space, the magnetic conductor comprises a bottom wall and a side wall bending and extending along the bottom wall, the bottom wall and the side wall together form the containing space, the main magnet is fixed on the bottom wall, the main magnet and the side wall are spaced from each other to form a magnetic gap, and the coil is inserted into the magnetic gap and surrounds the main magnet, the side wall comprises a pair of first side walls arranged symmetrically in a long axis direction and a pair of second side walls arranged symmetrically in a short axis direction, the first side wall is connected with the second side wall, the pair of elastic members is provided and is respectively connected with the pair of second side walls, each elastic member comprises a first connecting portion fixedly connected with the second side wall, a pair of elastic portions bending and extending from two opposite ends of the first connecting portion, and a pair of second connecting portions extending from a tail end of each elastic portion in a direction facing each other, the pair of second connecting portions is fixedly connected with the housing so that the vibrator is suspended in the accommodating space.

2. The vibration device as described in claim 1, wherein the elastic portion comprises a first elastic connecting arm connected with the first connecting portion and a second elastic connecting arm connected with the second connecting portion, the first elastic connecting arm is connected with the second elastic connecting arm to form an include angle.

3. The vibration device as described in claim 1, wherein the second side wall is provided with a protruding portion extending to the housing, and the first connecting portion is connected with the protruding portion.

4. The vibration device as described in claim 3, wherein the protruding portion is located in a central area of the second side wall in the short axis direction.

5. The vibration device as described in claim 1, wherein the magnetic circuit unit further comprises a pole plate, the pole plate is fixedly arranged at a side of the main magnet, and the side of the main magnet is facing away from the bottom wall of the magnetic conductor.

6. The vibration device as described in claim 1, wherein the vibration device further comprises a printed circuit board, the printed circuit board is arranged between the cover plate and the coil, the coil is electrically connected with the printed circuit board, the coil is fixed at a side of the cover plate by the printed circuit board, and the side of the cover plate faces the housing.

7. An electronic device, comprising: a vibration device as described in claim 1.

* * * * *